(12) United States Patent
Tresser

(10) Patent No.: US 7,265,872 B2
(45) Date of Patent: Sep. 4, 2007

(54) ERROR DIFFUSION WITH AVERAGED DIRECTIONAL BIASES

(75) Inventor: Charles P. Tresser, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 10/684,641

(22) Filed: Oct. 15, 2003

(65) Prior Publication Data
US 2005/0083554 A1    Apr. 21, 2005

(51) Int. Cl.
G06F 15/00 (2006.01)
G06K 1/00 (2006.01)
G06K 15/00 (2006.01)

(52) U.S. Cl. ...................... 358/1.9; 358/3.03
(58) Field of Classification Search ............. 358/1.9, 358/3.03, 3.04, 3.05, 3.06, 3.1, 3.23, 534, 358/536
See application file for complete search history.

(56) References Cited

U.S. PATENT DOCUMENTS

| | | | |
|---|---|---|---|
| 4,654,721 A | 3/1987 | Goertzel et al. | |
| 5,051,844 A | 9/1991 | Sullivan | |
| 5,467,201 A | 11/1995 | Fan | |
| 5,521,989 A | 5/1996 | Fan | |
| 5,592,592 A | 1/1997 | Shu | |
| 5,668,638 A | 9/1997 | Knox | |
| 5,684,932 A | 11/1997 | Shu | |
| 5,701,366 A * | 12/1997 | Ostromoukhov et al. | ... 382/237 |
| 6,160,921 A | 12/2000 | Marcu | |
| 6,307,647 B1 | 10/2001 | Cheung et al. | |
| 6,333,793 B1 | 12/2001 | Kobayashi | |
| 6,614,556 B1 | 9/2003 | Hong et al. | |
| 7,050,194 B1 * | 5/2006 | Someno et al. | ............. 358/1.9 |
| 7,079,289 B2 * | 7/2006 | Loce et al. | ................ 358/3.03 |

OTHER PUBLICATIONS

Jagmohan, A., et al., "Isotropic Error Diffusion Halftoning", 4 pgs.
Yu, Q., et al., "Stochastic Screen Design Using DSymmetric Error Compensation", 20 pgs; 1993 (translated on Jul. 18, 1997).

* cited by examiner

Primary Examiner—Douglas Q. Tran
(74) Attorney, Agent, or Firm—Whitham, Curtis, Christofferson & Cook, PC; Stephen C. Kaufman

(57) ABSTRACT

A method and system are provided to perform digital printing using error diffusion but without the usual problems of the anisotropy associated with that method. The method computes several error diffused digital images on a variety of rasters, and averages them with some chosen set of weights. The method works directly for printers with more than two choices per color per pixel, and can be implemented by defining super-pixels, even with the simpler printers that have only white and black or two color value per color coordinate.

43 Claims, 4 Drawing Sheets

ERROR DIFFUSION WITH AVERAGED DIRECTIONAL BIASES

CROSS-REFERENCE TO RELATED APPLICATION

The subject matter of this application is related to that of co-pending U.S. patent application Ser. No. 09/593,445 filed Jun. 15, 2000, by J. M. Gambaudo and C. Tresser for "Method and System Using Renormalized Pixels for Public Key and Compressed Images Watermarks on Prints" IBM and assigned to a common assignee herewith. The disclosure of application Ser. No. 09/593,445 is incorporated herein by reference.

BACKGROUND OF THE INVENTION

1. Field of the Invention

The present invention generally relates to digital printing and, more particularly, to digital printing methods using error diffusion (ED) but without the usual problems of anisotropy associated with ED methods.

2. Background Description

Error diffusion, as first described in "An Adaptive Algorithm for Spatial Greyscale" by R. W. Floyd and L. Steinberg in *Proceeding of the SID* 17/2, (1976) pp. 75-77, is a popular technique for halftoning used today and is considered to be one of the best, and the best among the techniques with similar operating time. This technique and others are reviewed in the book *Digital Halftoning*, MIT Press, Cambridge, Mass. 1987, by R. Ulichney which is a general reference for digital halftoning. H. Kang, *Color Technology for Electronic Imaging Devices*, SPIE Optical Engineering Press, Bellingham Washington (1997) is another general reference on digital printing, including digital color printing.

See also, J. F. Jarvis, C. N. Judice, W. H. Ninke, "A Survey of Techniques for the Display of Continuous Tone Pictures on Bilevel Displays", *Computer Graphics and Image Processing*, 5, pp. 13-40 (1976), P. Stucki, "MECCA-A Multiple Error Correction Computation Algorithm for BiLevel Image Hardcopy Reproduction", IBM Res. Rep RZ1060 (1981), for introductory papers on Black and White (BW) ED that is designed for greyscale images. Color images can then treated using such ED on the fundamental colors Cyan (C), Magenta (M), Yellow (Y), and optionally Black (K), since K=C+M+Y, but using a separate K is more economical and usually provides a sharper black.

U.S. Pat. No. 5,070,413 to J. R. Sullivan, R. L. Miller, and T. J. Wetzel for "Color Digital Halftoning with Vector Error Diffusion" discloses ED working directly in the full color space (one sometimes speaks of Vector Error Diffusion (VED) in this case).

U.S. Pat. No. 6,101,001 to C. P. Tresser and C. W. Wu for "Target Patterns Controlled Error Management" provides a description of a multitude of different algorithms of Error Diffusion.

See J. P. Allebach and B. E. Rogowitz, eds., *Proceedings, SPIE—The International Society for Optical Engineering: Human Vision, Visual Processing, and Digital Display IV*, vol. 1913, (San Jose, Calif.), SPIE, February 1993, for a collection of reprints that cover digital halftoning until 1993.

See also, U.S. Pat. No. 6,614,556 to D.-E Hong, C.-W Kim, and G.-N Boo for "Apparatus for Quantizing a Digital Image by Using an Error Diffusion Coefficient and Threshold Modulation in Zigzag Quantization", U.S. Pat. No. 6,333,793 to K. Kobayashi for "Image Quality in Error Diffusion Scheme", U.S. Pat. No. 6,307,647 to A. C. Cheung, S. M. Heydinger, and S. T. Love for "Digital Halftoning With Error Diffusion", U.S. Pat. No. 6,160,921 to G. G. Marcu for "Error Diffusion with Homogeneous Distribution in Highlight and Shadow Regions", U.S. Pat. No. 5,684,932 to J. S. Shu for "Method and Apparatus for Dither Array Generation to Reduce Artifacts in Halftoned Image Data Utilizing Ink Reduction Processing", U.S. Pat. No. 5,668,638 to K. T. Knox for "Error Diffusion Method with Symmetric Enhancement", U.S. Pat. No. 5,592,592 to J. S. Shu for "Method and Apparatus for Minimizing Artifacts in Images Produced by Error Diffusion Halftoning Utilizing Ink Reduction Processing", U.S. Pat. No. 5,521,989 to Z. Fan for "Balanced Error Diffusion System", U.S. Pat. No. 5,467,201 to Z. Fan for "Iterative Error Diffusion System", U.S. Pat. No. 5,051,844 to J. R. Sullivan for "Digital Halftoning with Error Diffusion", and U.S. Pat. No. 4,654,721 to G. Goertzel and G. R. Thompson for "System for Reproducing Multi-Level Digital Images on a Bi-Level Printer of Fixed Dot Size", Qing Yu and Kevin J. Parker, "Stochastic Screen Design using Symmetric Error Compensation", University of Rochester (1997), and Ashish Jagmohan, Anshul Sehgal and Narendra Ahuja, "Isotropic Error Diffusion Halftoning", University of Illinois, for a collection of attempts at solving the problem of anisotropy in ED, with partial results.

The problem of the consequences of anisotropy in ED (in particular the consequences on image quality) is considered as still mostly open despite the significant progresses which have been made since ED was invented, and as represented by the cited prior art.

Although considered a high quality method, ED is marred with the problem that it is strongly anisotropic as the result depends strongly on the raster utilized to enumerate the pixels on a page. ED generates worm-like patterns, and other artifacts at the scale of the pixels. These artifacts affect the quality of the image, and are indeed attributed to the very anisotropic character of the algorithm.

The importance of this invention is increased at a time when ink-jet printers arrive in the high end market and (the computational and data handling parts of the) processing times are bound to decrease dramatically for a few more years according to the perspective one has on the progress of core Information Technologies (IT), a decrease that one expects will be faster than the decrease in the mechanical part of the processing (actual printing and paper handling).

SUMMARY OF THE INVENTION

It is therefore an object of the present invention to provide a cure for the anisotropy problem for multi-bit printers, that can print any of $2^b$ grey levels at each pixel for b bits, and more generally printers that can print any number G>1 of grey levels.

According to the invention, there is provided a method to perform digital printing using error diffusion but without the usual problems of the anisotropy associated to that method. More particularly, the problems of the anisotropy associated to error diffusion are avoided, for printers that can print more grey levels than just white and black at each pixel, by choosing several rasters and error diffusions methods along these rasters (that may or not be all the same on the different rasters). Digital images are created for these pairs made by a raster and an algorithm followed by performing weighted averaging of the digital images obtained along the rasters, using some chosen set of weights to perform the weighted averaging, so that the average value at each pixel can be rendered at that pixel. The invention can also be implemented with printers that have only white and black as possible outputs at each pixel, by creating super-pixels, blocks of B pixels whose outputs in terms of grey level can take B+1 values.

As well known in the art of digital printing (see, for example, Qing Yu and Kevin J. Parker, ibid.), once an ED has been devised, it can be used to generate masks to use in the dithering method for digital printing, so that the present invention also provides new means to build masks.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

While this invention may be more useful for printing, it can as well be used with other display that have a digital representation of the image with relatively low number of grey levels or colors at each pixel (for screen) or pel (for printing). We use the word pixel which is better known among non professionals as meaning either pel or pixel depending on the context.

Figure 1A:
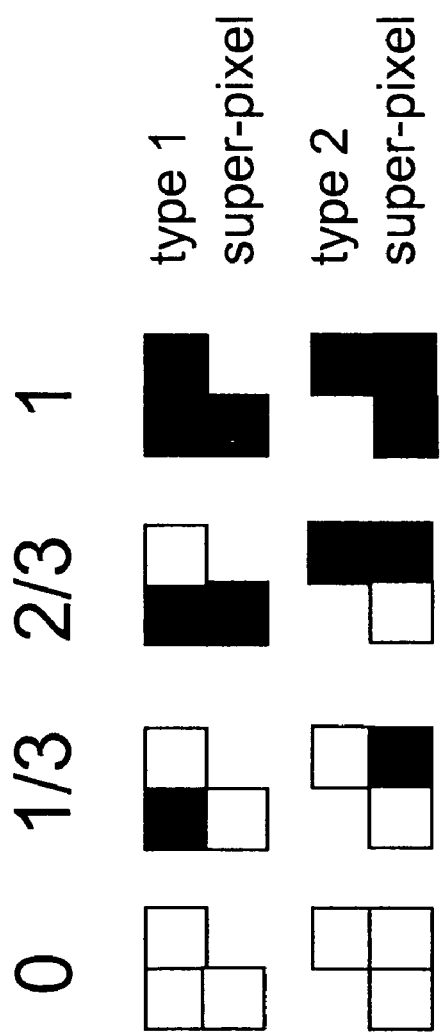
FIGS. 1a and 1b are diagrams illustrating super-pixels that can be used to implement the invention with one bit per pixel digital printers.
Figure 1B:
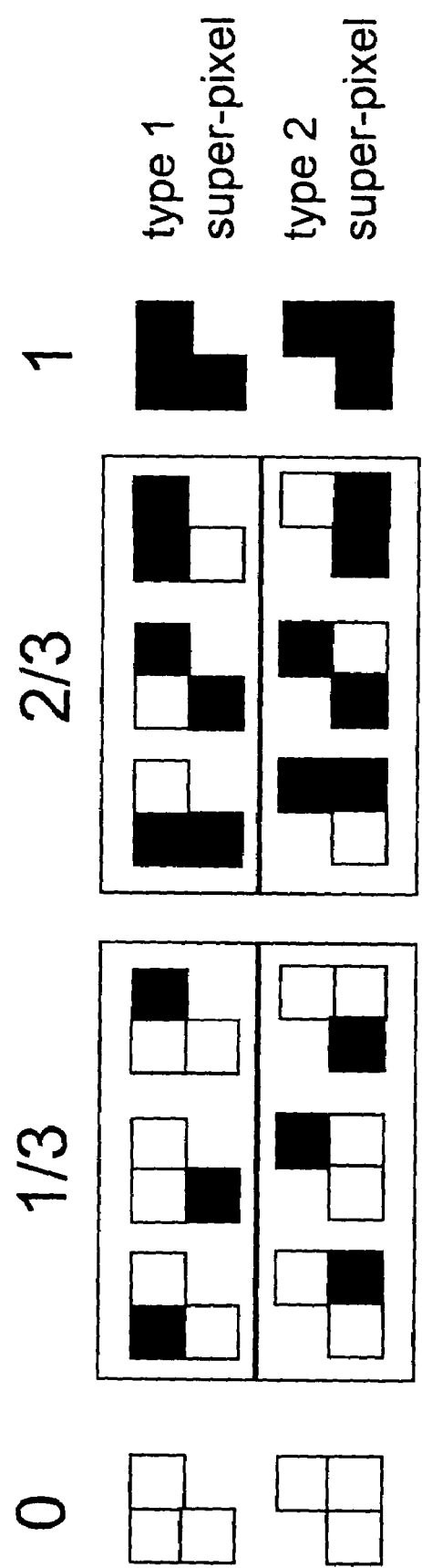

A multi-bit printer, that can print any of $2^b$ grey levels at each pixel for b bits, and more generally printers that can print any number G>1 of grey levels, can be simulated by a one-bit printer (which can print only two grey levels, White or 0 and Black or 1, at each pixel) by creating super-pixels that are blocks of $2^b-1$ (or more generally, B=G−1) basic pixels. FIG. 1a shows examples of two types of super-pixels with 2 bits (3 pixels per block) that are used in conjunction to pave the page. The representation of ⅓ and of ⅔ can be fixed as for instance in FIG. 1a, which might be most adequate for some printers (or other display systems) whose pixels are rectangular rather than being square. The representation of ⅓ and of ⅔ can instead be variable, using all or part of the choices available to represent ⅓ and ⅔ as shown in FIG. 1b. Such choice of the representation when the grey level of the super-pixel has been determined to be ⅓ or ⅔ can be made in many ways, for instance:

at random,
or using a preselected ordering of representations to get the best possible image quality:
  out of a given printer (e.g., by making tests of various periodic sequences of the different renderings of a given grey value),
  or out of a family of printers (e.g., again by making tests of various periodic sequences of the different renderings of a given grey value),
the preselected ordering being made so as to either:
  depend on the grey level being represented (this is again done by laborious but easy to make testing),
  or to not depend on the grey level being represented, or the choices of representation of ⅓ and ⅔ to encode and hide some information in the super-pixels using the teaching of co-pending application Ser. No. 09/593,445.

Notice that similar procedures to what have been illustrated in FIGS. 1a and 1b with two bits (or equivalently G=4) could be used with other values of G, and one could expect small values of G to be more adequate for most displays. Also notice that the grey level values associated with groups of pixels have been computed in the example above by assuming that the printed pixels are perfect squares. For a lot of printers, there are in fact corrections to be taken into account to get the exact effect of depositing some dots at some pixels. A detailed method to take account of the effective characteristics of dots is presented in U.S. Pat. No. 5,946,455 to Tresser and Wu. It should be a simple matter for anyone well versed in the art of digital printing and finite mathematics to adapt such a method to the present invention.

As well known in the art, once a problem of the kind considered in the present invention is solved for BW, the solution for color follows immediately. In fact, in the case of color printing, the invention can be used either by treating the fundamental colors independently, or by using VED. These considerations about the application for color to what has been developed for Black and White printing apply to both the cases of one bit printers (when super-pixels must be used to implement the present invention), or printers with G>2 grey levels, and now G>2 color intensities per color dimension.

In fact, if one uses the CMY representation of the color space, where the ideal color space is the unit cube with axes corresponding to Cyan (C), Magenta (M), and Yellow (Y), White appear as the vector (0,0,0), and Black (K) as the vector (1,1,1). What is described along the grey axis in the Black and White case is done along each of the coordinates and one sums up the results. One can also extract the black out of all pixels and treat that as a Black and White picture when a separate ink or toner is used for the Black for economy or better rendering of the Black; then the rest is treated along the C, M, and Y axes. One can also use VED as mentioned previously where the modified input is approximated by the closest corner of the color space and the error is treated as a three dimensional vector (when using VED, one can still separate the Black and White part). Instead of the CMY space, one can use more realistic color spaces where the simple cube geometry disappears which makes it hard to work one color direction at a time, but which allows as easy use of VED (Vector Error Diffusion) as the CMY space.

Consider a printer that can print different G grey levels with G>2 at each pixel (not necessarily supposed to be uniformly distributed) on the grey levels scales (where 0 usually represents white and 1 represents black). We will choose some n with 0<n<G and then choose:

n algorithms that may be all different, be all the same, or any choice in between,
n different rasters, for instance, in the case when n=2, one could choose:
  the standard raster, defined by going down the page line by line, and each line from left to right, starting at the top left pixel which we designate by the pair formed by its column and line coordinates (1,1), and
  the inverted standard raster, defined by going up the page line by line, and each line from right to left, starting at the bottom right pixel (C,L) on a page with C columns and L lines of pixels.

Each ED algorithm Alg(M) in some library of ED algorithms can be defined by a set of weights defined for instance for the standard raster. As well know in the art, it is easy computation to adopt such weights to any raster, so that with:

L standing for the number of lines,
C standing for the number of columns,
$R_{K,L,C}$ standing for the $K^{th}$ raster choice, adapted to L lines and C columns, i.e., the pair $$R_{K,L,C}=(I_{K,L,C}, F_{K,L,C})$$

where:

$$I_{K,L,C}=(h(0, K, L, C), v(0, K, L, C)),$$

stands for the initial condition expressed by the original (starting) pixel of the raster, and where $F_{K,L,C}$ describes the evolution of pixels positions according to that $K^{th}$ raster as expressed by $$(h(m+1, K), v(m+1, K))=F_{K,L,C}[(h(m, K), v(m, K))].$$

With now (a,b) standing for the vector from the pixel being treated to the pixel whose error is being weighted, $$A(a, b, Alg(M), R_{K,L,C})$$

will stand for the set of weights for the $M^{th}$ choice of an algorithm adapted to the $K^{th}$ choice of a raster.

With such a set of weights $A(a, b, Alg(i), F_{i,L,C})$, where now i is an index that run from 1 to n, (so that a pair (K, M) of a raster and an algorithm has been associated to i) and an input image $I_{inp}$, it is well known in the art how to generate a corresponding digital output image $I_{dig}(i)$ with a grey level at each pixel defined using M(G, n, i) grey levels using the ED precisely described by the chosen set of weights $A(a, b, Alg(i), F_{i,L,C})$ Indeed, the modified input $M_i(h, v)$ at pixel (h, v) reads:

$$M_i(h, v)=I_{inp}(h, v)+\Sigma_{(a,b) \text{ in } V(i)}W_{(a,b)}Er_i(h+a, v+b),$$

where V(i) is the set of vectors (defined by Alg(i) and $R_{i,L,C}$) where the errors needs to be taken into account to modify the input $I_{inp}(h, v)$ at (h, v), and $W_{(a,b)}$ is the weight at (h+a, v+b) in the set of weights $A(a, b, Alg(i), F_{i,L,C})$. One can use errors zero out of the L lines and C columns to treat pixels near the boundary by the same formulas as the others. Other methods are easily devised; this is all part of the art of ED.

Given $M_i(h, v)$:
the output $I_{dig}(i)(h, v)$ at (h, v) for the ED algorithm Alg(i) is Clos(M(G,n,i)), i.e., the closest grey level g(i,h,v) among the M(G,n,i) ones that are available, and
the new error $Er_i(h, v)$ computed at (h, v) is just:

$$Er_i(h, v)=M_i(h, v)-I_{dig}(i)(h, v).$$

The number M(G,n,i) is, as mentioned, the number of possible output grey levels (including 0 and 1), so that M(G, n, i)>1, and for the simplicity of the exposition we will assume that M(G, n, i) does not depend on i, so that we will use M(G, n) instead of M(G, n, i) to designate the number of grey levels that are possible at each pixel by each of the algorithms Alg(i). The number M(G, n) is not a (well defined) function as what counts is the number G of outputs after averaging according to the present invention as described below, which has to correspond to the printer being used, or to the number of grey levels that can be rendered at each pixel or super pixel. The values of the grey levels coming out from the algorithm determines the number of distinct outputs as soon as both n and G are large enough. For instance, when n=2 and the weights for the image averaging are ½ and ½, and for M=4, the list of averaged outputs for outputs 0=g1, g2, g3, g4=1 for both ED algorithms is:

$$0, \frac{g2}{2}, \frac{g3}{2}, \frac{1}{2}$$

$$g2, \frac{(g2+g3)}{2}, \frac{g2+1}{2}$$

$$g3, \frac{g3+1}{2}, 1.$$

One sees that according to whether g2+g3=1 or not, and according to whether $$\frac{g2+1}{2} = g3$$

or not, the number of averaged outputs that needs to be G is different. So for instance, for g2=⅓ and g3=⅔, the list can be rewritten as:

0, ⅙, ⅓, ½,
⅓, ½, ⅔,
⅔, ⅚,
1, with a list 0, ⅙, ⅓, ½, ⅔, ⅚, 1 of G=7 different outputs, and we see that M(4, 2)=4 is a possible choice. One can make M(G, n) a function if one imposes that the algorithms possible outputs are equally distributed among the possible M output grey levels and the weights for image average are all equal. Therefore, with averaging weights all set to be 1/n and with possible output grey levels for the ED algorithms all set to be of the form:

$$0, \frac{1}{(M-1)}, \frac{2}{(M-1)}, \dots, \frac{(M-2)}{(M-1)}, 1,$$

the number M(G, n) is a well defined function of G and n. Indeed, then the averaged outputs read $$0, \frac{1}{(n(M-1))}, \frac{2}{(n(M-1))}, \dots, \frac{(nM-n-1)}{(n(M-1))}, 1,$$

which implies that G=n(M−1)+1=nM−n+1, so that M(G, n) is then given by $$M(G, n) = \frac{(G-1+n)}{n}$$

under all these simplifying assumptions (and only in such case).

In the case of the so called multi-bit printers, the number G reads $2^b$, where b>1 stands for the number of output bits (b=1 would correspond to the single bit case, when only white or blacki can be rendered at each pixel), one has special forms $$M(2^b, n) = \frac{(2^b-1+n)}{n}$$

for the number of output grey level for the algorithms (Alg(i)). For instance, for $$b=2, 2^b=4 \text{ and } \frac{(2^b-1+n)}{n} = \frac{5}{2}, \text{ for } n=2,$$

which cannot be as M must be an integer, $$\frac{(2^b-1+n)}{n} = \frac{6}{3} = 2, \text{ for } n=3,$$

so that n=3 is a possible choice, $$\frac{(2^b-1+n)}{n} = \frac{7}{4}, \text{ for } n=4,$$

which cannot be as M must be an integer, and no further value of n is possible, so that for b=2 (or G=4), n=3 and M=2 is the only possible choice under all the simplifying assumptions that we have made. The averaged outputs are then 0, 1/3, 2/3, 1, and the possible grey for Alg(1), Alg(2) and Alg(3) are just 0 and 1.

According to the invention, the final image is obtained by averaging over the n images $I_{dig}(i)$, but the raster may be chosen so that averaging can begin before the images $I_{dig}(i)$ are computed so that less information needs to be traded (another possible tradeoff between efficiency and quality). The averaging can be done with equal weights for all images, but one may prefer to use different weights for the different rasters. For instance, one can take two rasters, each providing an image with a two grey levels (0 and 1), and take one image for one of the rasters with weight 2/3, and the other one with weight 1/3 to get 4 grey levels (0, 1/3, 2/3, and 1) for the averaged image. Altogether, there will need to be some tradeoff between the precision per image of the form $I_{dig}(i)$ and the willingness one has of destroying the wormy artifacts andy any further anisotropy artifact of ED. The right number n will in general depend not only on the printer being utilized, but also on the image, with images being possibly classifiable according for instance to the violence of the contrast, the presence or not of lots of straight lines, etc., which may help choosing appropriate combinations of rasters, algorithms and weights.

Figure 2:
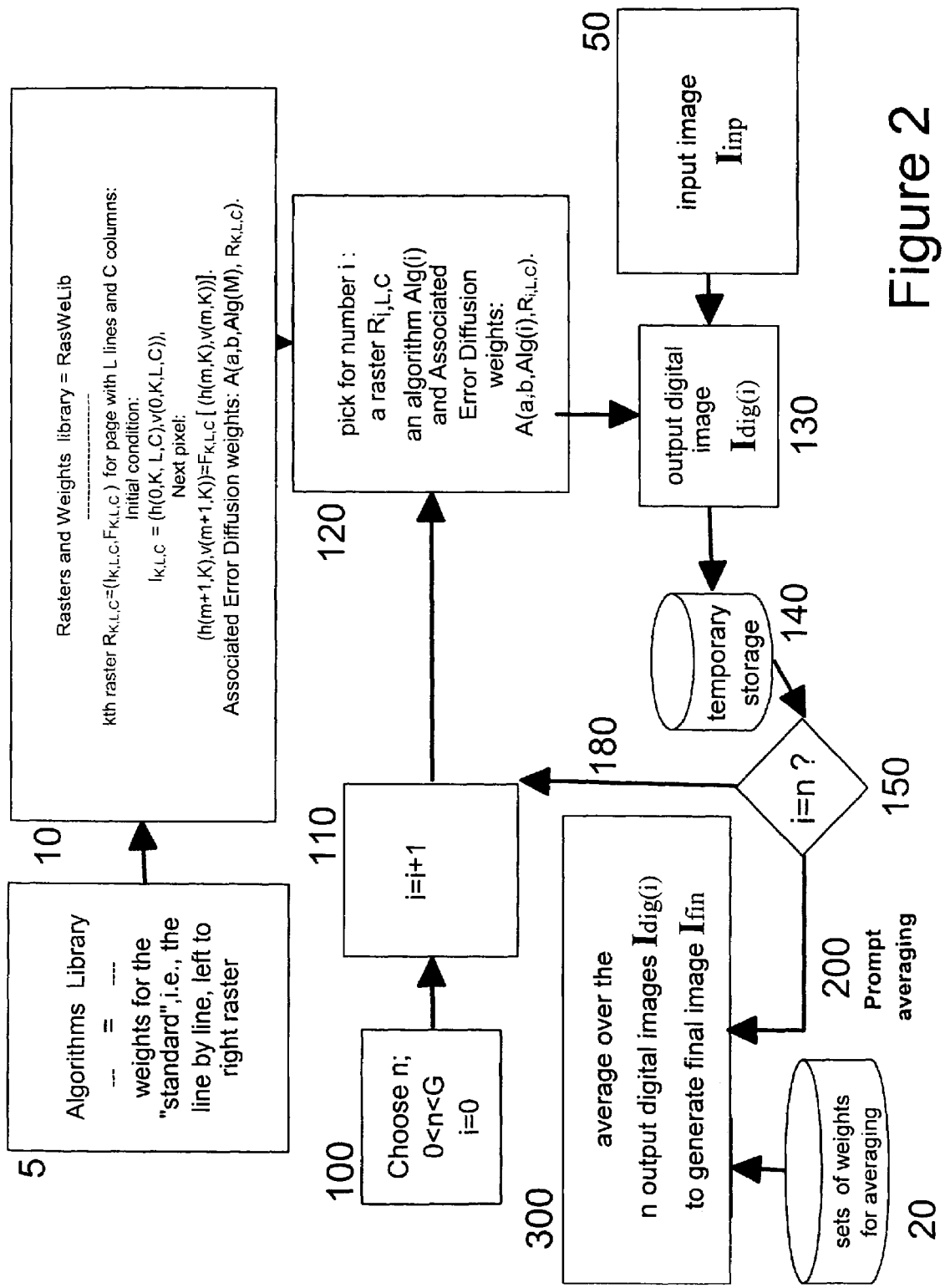
FIG. 2 is a flowchart representing the way the invention can be implemented.

With reference now to FIG. 2, one can follow how the invention can be implemented in a preferred embodiment. Block 5 is a library of ED algorithms, which can be kept for instance in standard form, i.e., by the weights that describe the algorithm with the standard raster which consists in following line by line, going down the line, and following each line from left to right. Block 10 is a library of rasters and of error diffusion algorithms (any given raster can come with any choice of error diffusion algorithm), where the raster can be for instance represented in the form $$R_{K,L,C} = (I_{K,L,C}, F_{K,L,C}),$$

where the index K designates the $K^{th}$ choice of raster, $I_{K,L,C}$ stands for an initial condition, i.e., the choice of an initial pixel on a page with L lines and C columns, $F_{K,L,C}$ stands for the function or lookup table that describes in which order the pixels are visited on the page to perform the chosen ED algorithm, so that with (h(0, K, L, C), v((0, K, L, C)) standing for the initial pixel of the raster $R_{K,L,C}$ (for instance for the standard raster, say $R_{I,L,C}$, (h(0, 1, L, C), v((0, 1, L, C))=(1, 1), i.e., the top left pixel of the page for any L and C), and (h(m, K, L, C), v((m, K, L, C)) standing for the $m^{th}$ pixel along the $K^{th}$ raster, we have (h(m+1, K, L, C), v(m+1, K, L, C))=$F_{K,L,C}$(h(m, 1, L, C), v((m, 1, L, C)).

For instance, with the standard raster (h(m+1, 1, L, C), v(m+1, 1, L, C))=(h(m, 1, L, C)+1, v(m, 1, L, C)), if h(m, 1, L, C)<C, (h(m+1, 1, L, C), v(m+1, 1, L, C))=(1, v(m, 1, L, C)+1), if h(m+1, 1, L, C)=C, and v(m, 1, L, C)<L, and is not defined if h(m+1, 1, L, C)=C, and v(m, 1, L, C)=L, i.e., the raster stops there.

At block 10 there is also a library of ED algorithms indexed by M. If the algorithm Alg(M) is chosen with the raster $R_{K,L,C}$ its set of weights is adapted as the set $\{W(a, b)\} = A(a, b, Alg(M), R_{K,L,C})$ such that the modified input from an input image $I_{inp}$ at pixel (h, v) reads:

$M_{K,M}(h, v) = I_{inp}(h,v) + \Sigma_{(a,b) \text{ in } V(M)} W_{(a,b)} Er_{K,M}(h+a, v+b),$ where V(M) is the neighborhood associated to the algorithm Alg(M) and the raster $R_{K,L,C}$ and $Er_{K,M}(i, j)$ stands for the error at pixel (i, j) for the choices K for the raster and M for the ED algorithm and whichever image is being treated.

At database 20, there are sets of weights for averaging the output digital images $I_{dig}(i)$. A set of weights may be chosen once and for all, or may depend on the rasters being used, the algorithm being used, and the input images of some classes of input images (such as dark versus clear, landscapes or portraits or neither, etc.).

At input block 50 is the input image that is a matrix (or array) $I_{inp}(h, v)$. We assume that G>2 stands for the number of grey levels that can be rendered at each pixel (in the case when G=2, one builds super-pixels as explained previously to have an effective number of grey level greater than two). At function block 100, one chooses some number n, with 0<n<G, of rasters that will be used for the process of digital printing according to the present invention. This number n of rasters and of algorithms (although all algorithms may correspond to the same one on the standard raster) will be chosen at function block 120 from the library 10, i.e., for each i that satisfies the inequality (limits on i) 0<i<n+1 a raster among the rasters $R_{K,L,C}$ that we designate by $R_{i,L,C}$, and an algorithm among the algorithms Alg(M) that we designate by Alg(i).

With i initialized to be 0 at function block 100, i is incremented at function block 110, replacing the input i by an output new value i+1. At function block 120, the raster $R_{i,L,C}$ and the algorithm Alg(i) with order number i for the pass of the method, as described previously, are picked. There s a set of ED weights A(a, b, Alg(i), $R_{i,L,C}$) associated to the choices of the raster $R_{i,L,C}$ and the algorithm Alg(i). At function block 120 is also chosen the number M(G, n) of grey levels among which outputs will be sought by the algorithms Alg(i), and the grey levels themselves among which the outputs will be sought. In fact, M(G, n) and the grey levels themselves among which the outputs will be sought are part of the specifications of the algorithms, besides the ED weights A(a, b, Alg(i), $R_{i,L,C}$) The number M=M(G, n) and the grey levels themselves among which the outputs will be sought are such that after averaging the possible outputs at each pixel, one gets the G grey level that are printable at each pixel by the printer (but the grey levels themselves among which the outputs will be sought are abstract in the sense that they only participate to average and need not be printable). So if the grey levels themselves among which the outputs will be sought are 0=g1<g2< . . . <gM=1, (where we have ignored the freedom of dependence on i for an easier exposition, but that freedom can be used in the invention as anyone versed in the art of combinatorics would understand readily), and the weights for averaging from database 20 are W1, W2, . . . , Wn, the possible outputs are

0,

W1.g2, W2.g2, . . . , Wn.g2,

W1.g3, W2.g3, . . . , Wn.g3,

W1.g(M−1), W2.g(M−1), . . . , Wn.g(M−1),

W1, W2, . . . , Wn,

W1.g2+W2.g2, W1.g2+W3.g2, . . . , W1.g2+Wn.g2,

W1.g2+W2.g3, W1.g2+W3.g3, . . . , W1.g2+Wn.g3,

W1.g2+W2, W1.g2+W3, . . . , W1.g2+Wn,

W1.g3+W2.g2, W1.g3+W3.g2, . . . , W1.g3+Wn.g2, and so on. For instance, in the case of two rasters with equal weights ½, if the grey levels among which the outputs will be sought for individual images are 0=g1<g2< . . . <gM=1, the possible averages are $$0, \frac{g2}{2}, \frac{g3}{2}, \frac{g4}{2}, \ldots, \frac{1}{2}$$

$$g2, \frac{(g2+g3)}{2}, \frac{(g2+g4)}{2}, \ldots, \frac{(g2+g1)}{2}$$

$$g3, \frac{(g3+g4)}{2}, \frac{(g3+g5)}{2}, \ldots, \frac{(g3+g1)}{2}$$

$$g(M-2), (g(M-2)+g(M-1)), \frac{(g(M-2)+1)}{2}$$

$$g(M-1), \frac{(g(M-1)+1)}{2}, 1:$$

When M=4, the list becomes $$0, \frac{g2}{2}, \frac{g3}{2}$$

$$g2, \frac{(g2+g3)}{2}, \frac{(g2+g1)}{2}$$

$$g3, \frac{(g2+g1)}{2}$$

1, so that M(7, 2)=4 works with g2=⅓ and g3=2/3 for seven outputs 0, ⅙, ⅓, ½, ⅔, ⅚, 1. When M=3, the list becomes $$0, \frac{g2}{2}$$

$$g2, \frac{(g2+g1)}{2}$$

1, so that M(5, 2)=3 works with g2=½ for five outputs 0, ¼, ½, ¾, 1. When M=2, the list becomes

0, ½

1, which forces G=3.

As we have seen, and as well known in the art, the adaptation of an ED to color once it is well defined for black and white poses no problem, for instance by using three independent color planes, or by first extracting the black part and then treating what remains with three independent color planes.

At function block 130 the digital image $I_{dig}(i)$ corresponding to the input image $I_{inp}$ at 50 and to the choices of $R_{i,L,C}$ and Alg(i) and of the associated ED weights A(a, b, Alg(i), $R_{i,L,C}$) at function block 120 is computed. This digital image $I_{dig}(i)$ is then sent to a temporary storage 140. From temporary storage 140, a comparison is made at decision block 150 to determine whether or not i=n. If not, i<n and one follows the path 180 to get back to the adder for incrementing i at 110, from where one continues as before. If yes, i=n and one follows the path 200 that prompts averaging of all the digital images $I_{dig}(i)$, i=1, 2, . . . , n corresponding to the input images $I_{inp}$ at input block 50, and the choices at function block 120, and accumulated in the temporary storage at 140, using the weights prepared according to all the choices at database 20, resulting to the final output image $I_{fin}$ according to the present invention at 300.

The averaging process can be done on parts of images rather than on full images to save some space, or to judge the choice made of the rasters and algorithm before the whole processing is done.

Figure 3:
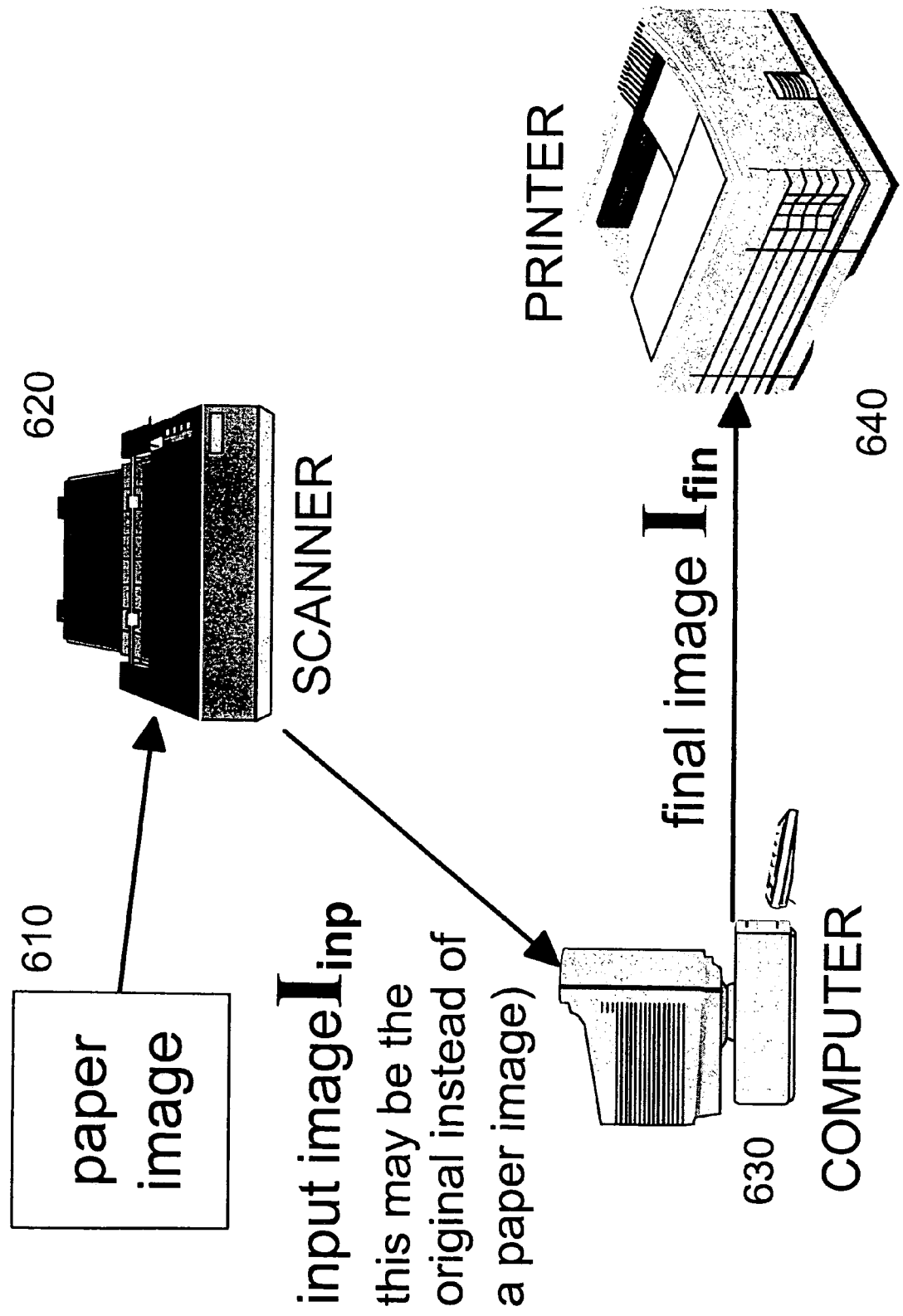
FIG. 3 a diagram that illustrates the typical flow from an input image to an output image to be printed with a digital printer.

With reference now to FIG. 3, there is shown the typical situation where a paper image 610 is scanned at scanner 620 to generate a digital image, although the digital image can be the form in which the image to be printed is given. After processing of the image in the computer 630, the digital image associated to the input image according to the present invention is printed on the digital printer at 640. The method can be installed in the computer using different means such as a diskette, or using transfer through a network, including a global network such as the Internet, and updates such as new rasters or new algorithms can be installed in the same way.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of digital printing using error diffusion but without anisotropy associated with error diffusion, comprising the steps of:

inputting an image, choosing several rasters, choosing several error diffusion algorithms along the chosen rasters, creating digital images of the input image using pairs of a chosen raster and a chosen algorithm, performing weighted averaging of said digital images obtained along the rasters, using some chosen set of weights to perform weighted averaging, so that an average value at each pixel can be rendered at that pixel, and generating a final image from the weighted average of said digital images.

2. The method of digital printing as recited in claim 1, wherein the step of generating a final image is performed by a black and white printer.

3. The method of digital printing as recited in claim 2, wherein the black and white printer is capable of rendering more than two grey levels at each pixel.

4. The method of digital printing as recited in claim 2, wherein the black and white printer is capable of rendering only two grey levels at each individual pixel, and wherein the step of generating a final image further includes the step of generating super-pixels composed of blocks of more than one pixel.

5. The method of digital printing as recited in claim 4, wherein the rendering of any grey level is fixed and depends only on the grey level to be rendered.

6. The method of digital printing as recited in claim 4, wherein the criteria chosen is a random choice of different ways to render a given grey level.

7. The method of digital printing as recited in claim 4, wherein the rendering of any grey level is made using a preselected ordering of representations to get the best possible image quality out of a printer or a family of printers.

8. The method of digital printing as recited in claim 7, wherein the preselected ordering being made so as to either depend on the grey level being represented.

9. The method of digital printing as recited in claim 6, wherein the criteria chosen is based on information in the way grey level renderings are chosen.

10. The method of digital printing as recited in claim 1, wherein the step of generating a final image is performed by a color printer.

11. The method of digital printing as recited in claim 10, wherein the color printer can render more than two levels at each pixel in each color dimension.

12. The method of digital printing as recited in claim 10, wherein the color printer can render only two color levels at each individual pixel, and wherein the step of generating a final image further includes the step of generating super-pixels composed of blocks of more than one pixel.

13. The method of digital printing as recited in claim 12, wherein the rendering at any color level is fixed and depends only on the color level to be rendered.

14. The method of digital printing as recited in claim 12, wherein the rendering of any color level depends on the color level to be rendered and some other criteria chosen to enhance image quality.

15. The method of digital printing as recited in claim 14, wherein the criteria chosen is a random choice of different ways to render a given color level.

16. The method of digital printing as recited in claim 14, wherein the criteria chosen is a predetermined sequence of different ways to render a given color level.

17. The method of digital printing as recited in claim 14, wherein the criteria chosen is based on information in the way color level renderings are chosen.

18. The method of digital printing as recited in claim 1, wherein the several rasters and the several diffusion algorithms are chosen from libraries of rasters and algorithms.

19. The method of digital printing as recited in claim 18, wherein the libraries can be updated.

20. The method of digital printing as recited in claim 1, wherein the step of generating a final image is performed by a display device.

21. The method of digital printing as recited in claim 1, wherein the step of weighted averaging is made with unequal weights.

22. The method of digital printing as recited in claim 21, wherein the unequal weights depend on the image.

23. A digital printing system using error diffusion but without anisotropy associated with error diffusion, comprising:

a scanner for receiving an input image and generating a digital image;

a library of rasters and a library of error diffusion algorithms;

a database of sets of weights for averaging;

data processing means for choosing from the library of rasters and from the library of error diffusion algorithms several rasters and error diffusion algorithms along the chosen rasters, said data processing means creating digital images for pairs made by a raster and an algorithm and performing weighted averaging of said digital images obtained along the rasters, using some chosen set of weights from said database of sets of weights for averaging to perform the weighted averaging, so that the average value at each pixel can be rendered at that pixel; and an output device connected to said data processing means for generating a final image from the weighted average of said digital images.

24. The digital printing system recited in claim 23, wherein the output device is a display device.

25. The digital printing system recited in claim 23, wherein the output device is a printer.

26. The digital printing system recited in claim 25, wherein the printer is a black and white printer.

27. The digital printing system recited in claim 26, wherein the printer is capable of rendering more than two grey levels at each pixel.

28. The digital printing system recited in claim 26, wherein the printer is capable of rendering only two grey levels at each individual pixel, and wherein the data processing means generates super-pixels composed of blocks of more than one pixel.

29. The digital printing system recited in claim 28, wherein the rendering of any grey level is fixed and depends only on the grey level to be rendered.

30. The method of digital printing as recited in claim 28, wherein the criteria chosen is a random choice of different ways to render a given grey level.

31. The method of digital printing as recited in claim 28, wherein the rendering of any grey level is made using a preselected ordering of representations to get the best possible image quality out of a printer or a family of printers.

32. The method of digital printing as recited in claim 31, wherein the preselected ordering is made so as to depend on the grey level being represented.

33. The method of digital printing as recited in claim 31, wherein the criteria chosen is based on information in the way grey level renderings are chosen.

34. The digital printing system recited in claim 25, wherein the printer is a color printer.

35. The digital printing system recited in claim 34, wherein the printer is capable of rendering more than two color levels at each pixel.

36. The digital printing system recited in claim 34, wherein the printer is capable of rendering only two color levels at each individual pixel, and wherein the data processing means generates super-pixels composed of blocks of more than one pixel.

37. The digital printing system recited in claim 36, wherein the rendering of any color level is fixed and depends only on the color level to be rendered.

38. The method of digital printing as recited in claim 36, wherein the rendering of any color level depends on the color level to be rendered and on some other criteria chosen to enhance image quality.

39. The method of digital printing as recited in claim 38, wherein the criteria chosen is a random choice of different ways to render a given grey level.

40. The method of digital printing as recited in claim 38, wherein the criteria chosen is a predetermined sequence of different ways to render a given grey level.

41. The method of digital printing as recited in claim 38, wherein the criteria chosen is based on information in the way grey level renderings are chosen.

42. The printing system recited in claim 23, wherein the weighted averaging performed by the data processing means is made with unequal weights.

43. The digital printing system as recited in claim 42, wherein the unequal weights depend on the image.

\* \* \* \* \*